(12) United States Patent
Dong et al.

(10) Patent No.: US 8,100,204 B2
(45) Date of Patent: Jan. 24, 2012

(54) MOUNTING OF HYDROSTATIC TRANSMISSION FOR RIDING LAWN MOWER

(75) Inventors: Xingen Dong, Farmington, CT (US); Barun Acharya, Johnson City, TN (US)

(73) Assignee: Parker-Hannifin Corporation, Cleveland, OH (US)

( * ) Notice: Subject to any disclaimer, the term of this patent is extended or adjusted under 35 U.S.C. 154(b) by 0 days.

(21) Appl. No.: 12/849,932

(22) Filed: Aug. 4, 2010

(65) Prior Publication Data
US 2011/0024220 A1 Feb. 3, 2011

Related U.S. Application Data

(63) Continuation of application No. 11/563,122, filed on Nov. 24, 2006, now abandoned.

(60) Provisional application No. 60/739,872, filed on Nov. 23, 2005.

(51) Int. Cl.
*B62D 11/02* (2006.01)
*B60K 7/00* (2006.01)
*B60K 17/14* (2006.01)

(52) U.S. Cl. .................. 180/6.48; 180/308; 60/487

(58) Field of Classification Search .............. 180/6.48, 180/308; 60/464, 487, 488; 417/269, 270, 417/271
See application file for complete search history.

(56) References Cited

U.S. PATENT DOCUMENTS

| | | | | |
|---|---|---|---|---|
| 2,834,297 A * | 5/1958 | Postel et al. | ............ | 91/506 |
| 2,936,589 A * | 5/1960 | Quintilian | ............ | 60/464 |
| 2,988,007 A * | 6/1961 | Quintilian | ............ | 418/27 |
| 3,090,456 A * | 5/1963 | Blenkle | ............ | 180/253 |
| 3,493,067 A * | 2/1970 | Rumsey | ............ | 180/55 |
| 3,643,434 A * | 2/1972 | Widmaier | ............ | 60/437 |
| 3,890,783 A * | 6/1975 | Allen et al. | ............ | 60/420 |
| 3,949,824 A * | 4/1976 | Bennett | ............ | 180/62 |
| 4,064,766 A * | 12/1977 | Rinaldo | ............ | 74/473.11 |
| 4,070,219 A * | 1/1978 | Farnam | ............ | 156/192 |
| 4,071,106 A * | 1/1978 | Junck et al. | ............ | 180/307 |
| 4,171,559 A * | 10/1979 | Vyse et al. | ............ | 29/407.01 |
| 4,285,643 A * | 8/1981 | White | ............ | 418/61.3 |
| 4,580,646 A * | 4/1986 | Tokunaga | ............ | 180/6.48 |
| 4,616,478 A * | 10/1986 | Jensen | ............ | 60/487 |
| 4,627,237 A * | 12/1986 | Hutson | ............ | 60/487 |
| 4,843,817 A * | 7/1989 | Shivvers et al. | ............ | 60/487 |
| 4,845,949 A * | 7/1989 | Shivvers et al. | ............ | 60/436 |
| 4,870,820 A * | 10/1989 | Nemoto | ............ | 60/487 |
| 4,903,792 A * | 2/1990 | Ze-ying | ............ | 180/308 |
| 4,936,095 A * | 6/1990 | Ross et al. | ............ | 60/444 |
| 5,018,351 A * | 5/1991 | Otte | ............ | 60/448 |
| 5,181,837 A * | 1/1993 | Niemiec | ............ | 417/350 |
| 5,205,123 A * | 4/1993 | Dunstan | ............ | 60/487 |
| 5,317,936 A * | 6/1994 | Shiba et al. | ............ | 74/606 R |
| 5,356,347 A * | 10/1994 | Komura et al. | ............ | 474/28 |
| 5,373,697 A * | 12/1994 | Jolliff et al. | ............ | 60/454 |
| 5,497,623 A * | 3/1996 | Hauser et al. | ............ | 60/487 |
| 5,557,931 A * | 9/1996 | Hauser et al. | ............ | 60/455 |

(Continued)

*Primary Examiner* — Tony H. Winner
*Assistant Examiner* — Marc Scharich
(74) *Attorney, Agent, or Firm* — Renner, Otto, Boisselle & Sklar, LLP (57) ABSTRACT

A hydrostatic transmission including a pump and motor connected by supply and return lines. The hydrostatic transmission can be an integrated unit mountable to a vehicle frame as a unit. The motor portion of the transmission is configured to be at least partially received within a wheel to which an output shaft of the motor can be directed connected. Accordingly, the output shaft of the motor can be configured to function as a wheel axle.

13 Claims, 12 Drawing Sheets

U.S. PATENT DOCUMENTS

| | | | |
|---|---|---|---|
| 5,622,051 A * | 4/1997 | Iida et al. | 60/456 |
| 5,918,691 A * | 7/1999 | Ishii | 180/6.48 |
| 5,921,151 A * | 7/1999 | Louis et al. | 74/606 R |
| 5,950,500 A * | 9/1999 | Okada et al. | 74/606 R |
| 5,979,270 A * | 11/1999 | Thoma et al. | 74/606 R |
| 6,010,423 A * | 1/2000 | Jolliff et al. | 475/93 |
| 6,030,182 A * | 2/2000 | Voigt | 417/222.1 |
| RE36,807 E * | 8/2000 | Okada | 60/454 |
| 6,152,247 A * | 11/2000 | Sporrer et al. | 180/6.28 |
| 6,209,928 B1 * | 4/2001 | Benett et al. | 285/124.1 |
| 6,220,377 B1 * | 4/2001 | Lansberry | 180/9.36 |
| 6,233,929 B1 * | 5/2001 | Okada et al. | 60/456 |
| 6,237,332 B1 * | 5/2001 | Thoma et al. | 60/456 |
| 6,343,471 B1 * | 2/2002 | Thoma et al. | 60/487 |
| 6,427,442 B2 * | 8/2002 | Thoma et al. | 60/456 |
| 6,427,443 B2 * | 8/2002 | Smothers et al. | 60/488 |
| 6,481,203 B1 * | 11/2002 | Johnson et al. | 60/487 |
| 6,487,856 B1 * | 12/2002 | Ohashi et al. | 60/464 |
| 6,487,857 B1 * | 12/2002 | Poplawski et al. | 60/487 |
| 6,508,059 B1 * | 1/2003 | Takada et al. | 60/454 |
| 6,554,084 B1 * | 4/2003 | Enmeiji | 180/6.24 |
| 6,564,550 B2 * | 5/2003 | Thoma et al. | 60/487 |
| 6,598,694 B2 * | 7/2003 | Forster | 180/305 |
| 6,643,959 B2 * | 11/2003 | Jolliff et al. | 37/244 |
| 6,672,058 B1 * | 1/2004 | Langenfeld et al. | 60/487 |
| 6,672,843 B1 * | 1/2004 | Holder et al. | 417/201 |
| 6,688,417 B2 * | 2/2004 | Hansell | 180/305 |
| 6,694,729 B1 * | 2/2004 | Trimble | 60/444 |
| 6,715,284 B1 * | 4/2004 | Poplawski et al. | 60/487 |
| 6,782,797 B1 * | 8/2004 | Brandenburg et al. | 92/12.2 |
| 6,804,958 B1 * | 10/2004 | Poplawski et al. | 60/436 |
| 6,817,960 B2 * | 11/2004 | Jolliff et al. | 475/83 |
| 6,843,056 B1 * | 1/2005 | Langenfeld et al. | 60/464 |
| 6,955,046 B1 * | 10/2005 | Holder et al. | 60/487 |
| 6,973,783 B1 * | 12/2005 | Hauser et al. | 60/484 |
| 7,036,311 B2 * | 5/2006 | Hauser et al. | 60/487 |
| 7,308,790 B1 * | 12/2007 | Bennett et al. | 60/487 |
| 7,316,287 B2 * | 1/2008 | Ohashi et al. | 180/307 |
| 2002/0179340 A1 * | 12/2002 | Jolliff et al. | 180/6.48 |
| 2003/0070429 A1 * | 4/2003 | Jolliff et al. | 60/487 |
| 2003/0116936 A1 * | 6/2003 | Felsing et al. | 280/124.166 |
| 2006/0039801 A1 * | 2/2006 | Dong et al. | 417/269 |
| 2007/0017712 A1 * | 1/2007 | Dunn | 180/6.48 |

\* cited by examiner

MOUNTING OF HYDROSTATIC TRANSMISSION FOR RIDING LAWN MOWER

RELATED APPLICATIONS

This application is a continuation of U.S. Nonprovisional application Ser. No. 11/563,122 filed Nov. 24, 2006, now abandoned which claims the benefit of U.S. Provisional Application No. 60/739,872 filed Nov. 23, 2005, which all of the foregoing is being incorporated herein by reference.

FIELD OF THE INVENTION

The present invention relates generally to hydraulic power units. More particularly, the invention relates to hydrostatic transmissions for use in vehicles, such as mowing machines.

BACKGROUND OF THE INVENTION

Hydrostatic transmissions have many uses, including the propelling of vehicles, such as mowing machines, and offer a stepless control of the machine's speed. A typical hydrostatic transmission system includes a variable displacement main hydraulic pump connected in a closed hydraulic circuit with a fixed displacement hydraulic motor. The closed hydraulic circuit includes a first conduit connecting the main pump outlet with the motor inlet and a second conduit connecting the motor outlet with a pump inlet. Either of these conduits may be the high pressure line depending upon the direction of pump displacement from neutral. For most applications, the pump is driven by a prime mover, such as an internal combustion engine or an electrical motor, at a certain speed in a certain direction. Changing the displacement of the main pump will change its output flow rate, which controls the speed of the motor. Pump outflow can be reversed, thus reversing the direction of the motor. In a vehicle, the motor is typically connected through suitable gearing to the vehicle's wheels or tracks.

In some vehicles, such as zero-turn-radius mowers, separate hydraulic pumps and motors are used to independently drive separate wheels of an axle. By independently driving the wheels in opposite directions, for example, the vehicle can be made to turn with zero radius. Zero-turn-radius mowers are increasingly popular as the size and costs of such mowers decrease. As the size of such mowers decreases, however, the space available for the hydraulic components and/or prime mover also decreases.

SUMMARY OF THE INVENTION

The present invention provides a hydrostatic transmission wherein the motor portion of the transmission is configured to be at least partially received within a wheel for direct mounting of the wheel to an output shaft of the motor. Accordingly, the output shaft of the motor can additionally function as a wheel axle.

According to one aspect of the invention, a hydrostatic transmission mountable as a unit to a frame of a vehicle comprises a housing assembly having a pump portion, a motor portion, and a bridge portion between the pump and motor portions. A pump is contained within the pump portion of the housing, the pump being configured to be driven by an input shaft of the hydrostatic transmission. A motor is contained within the motor portion of the housing and is connected to the pump via supply and return lines. The motor is configured to drive an output shaft of the hydrostatic transmission. The housing assembly includes a mounting surface for enabling the hydrostatic transmission to be secured to the frame such that the output shaft and motor portion of the housing extend outwardly from the frame such that when the output shaft has a wheel connected thereto, the motor portion of the housing can be at least partially received within the wheel.

In one embodiment, the distal end of the output shaft of the hydrostatic transmission functions as an axle for supporting a wheel. The mounting surface of the housing is associated with the motor portion of the housing such that radial loads applied to the output shaft are transmitted to the frame via the motor housing portion when the transmission is mounted to the frame. The transmission can be mounted to a vehicle having a frame, and a wheel can be mounted to the output shaft of the hydrostatic transmission for supporting the vehicle for movement over a surface.

According to another aspect of the invention, a hydraulic motor assembly comprises a motor housing mountable to a frame of a vehicle. The motor assembly includes a rotatably driven output shaft, a distal end of the output shaft being configured to function as an axle for supporting a wheel. The output shaft is connectable to a hub of a wheel such that the hydraulic motor assembly is at least partially received within the wheel when connected thereto.

In one embodiment, the hydraulic motor is part of a hydrostatic transmission assembly including a pump assembly connected via supply and return lines to the hydraulic motor assembly. The hydrostatic transmission assembly is mountable to the frame as a unit. The hydrostatic transmission assembly can have a housing assembly including the motor housing, a pump housing, and a bridge member between the pump housing and motor housing.

According to another aspect of the invention, a vehicle comprises a frame, a hydraulic motor assembly supported by the frame, and a wheel mounted to an output shaft of the motor assembly for supporting the vehicle for movement over a surface. The hydraulic motor assembly is at least partially received within the wheel. The hydraulic motor assembly can be mounted such that it is external to the frame. A hydraulic pump assembly can be connected to the hydraulic motor assembly by supply and return lines.

In one embodiment, the hydraulic pump assembly and hydraulic motor assembly are part of a hydrostatic transmission assembly mounted to the frame as a unit. The hydrostatic transmission has a housing assembly including a motor housing, a pump housing, and a bridge member between the motor housing and the pump housing. The hydraulic pump assembly is located inwardly of the frame towards the longitudinal center axis of the vehicle and the hydraulic motor assembly is located outwardly from the frame away from the longitudinal center axis of the vehicle. The motor housing portion supports the output shaft of the motor for transmitting radial loads applied to the output shaft to the frame. A brace member can be secured to the motor housing portion for resisting torsion resulting from radial loads applied to the output shaft.

Further features of the invention will become apparent from the following detailed description when considered in conjunction with the drawings.

DETAILED DESCRIPTION

Figure 1:
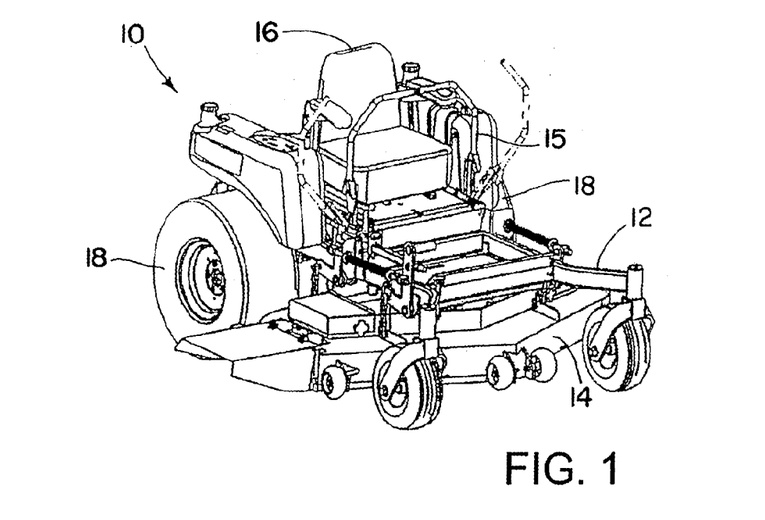
FIG. 1 is a zero-turn-radius mower in accordance with the invention.
Figure 2:
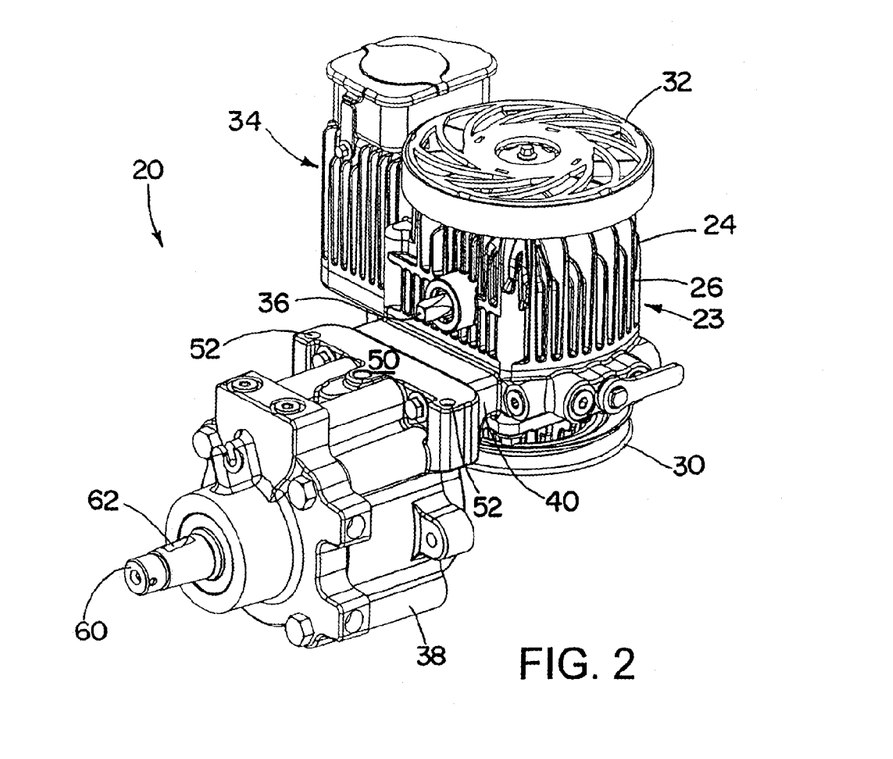
FIG. 2 is a perspective view of an exemplary hydrostatic transmission in accordance with the invention.
Figure 3:
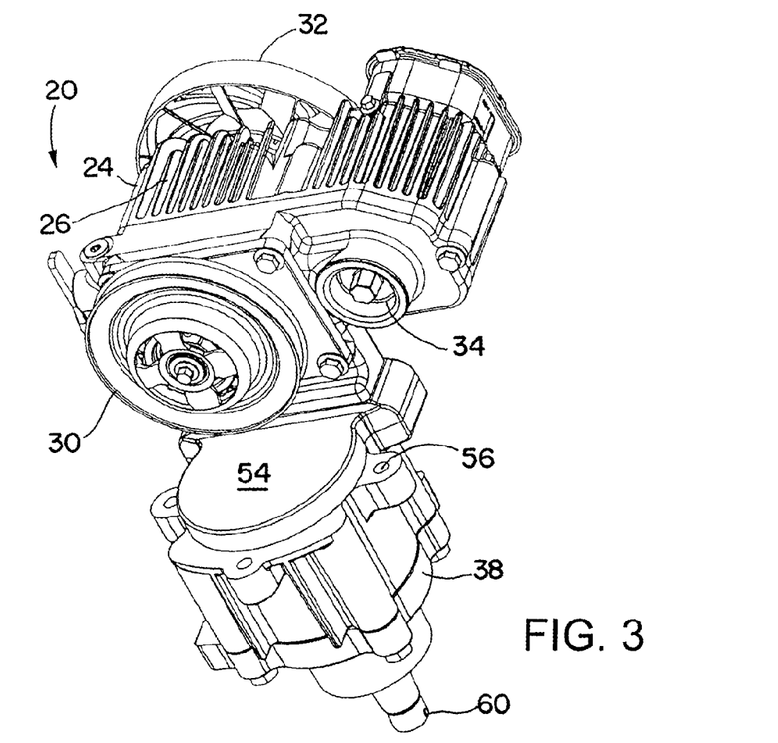
FIG. 3 is another perspective view of the hydrostatic transmission of FIG. 1.
Figure 4:
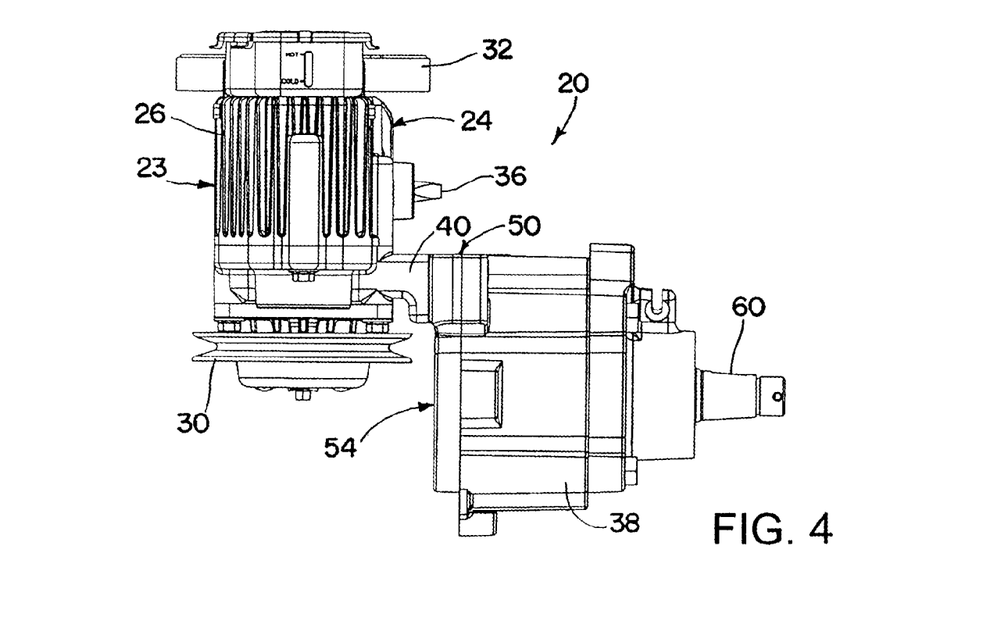
FIG. 4 is a front (or rear) elevational view of the hydrostatic transmission of FIG. 1.
Figure 5:
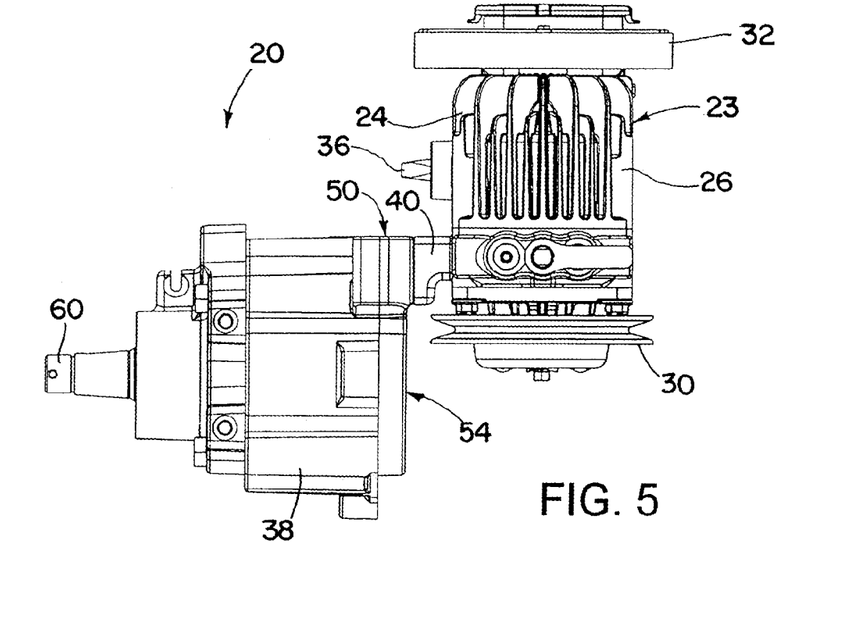
FIG. 5 is a rear (or front) elevational view of the hydrostatic transmission of FIG. 1.
Figure 6:
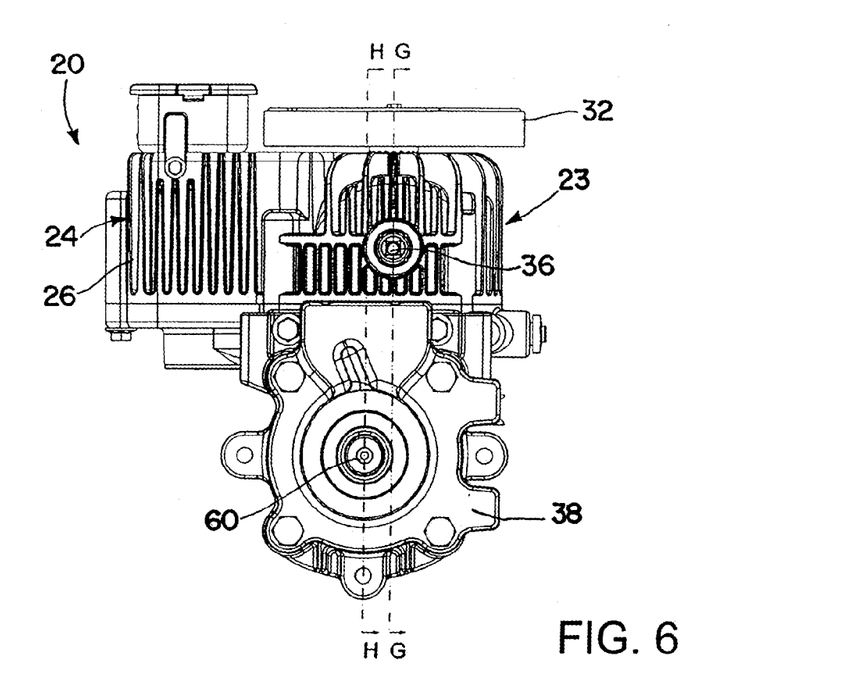
FIG. 6 is a side elevational view of the hydrostatic transmission of FIG. 1.
Figure 7:
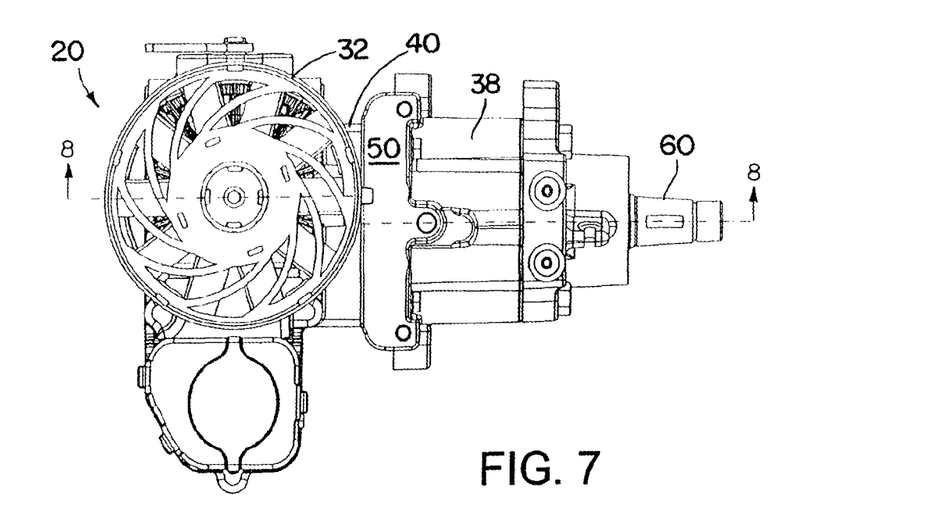
FIG. 7 is a top view of the hydrostatic transmission of FIG. 1.

Referring now to the drawings in detail, and initially to FIG. 1, an exemplary zero-turn-radius mower 10 is illustrated. The mower 10 includes a frame 12, a mower deck 14 supported by the frame 12 for mowing grass, an operator seat 16, and a plurality of controls 15 for operating the mower 10. A rear mounted engine mounted to the frame 12 behind the seat 16 provides power to first and second hydrostatic transmissions (motor and hydrostatic transmissions not shown in FIG. 1) also mounted to the frame 12. The hydrostatic transmissions can be controlled by an operator to independently drive respective rear wheels 18 to propel the mower and provide zero-turn-radius functionality. The design of the illustrated mower 10 is merely exemplary in nature, and it will be appreciated that other mower designs and vehicle types can be used in accordance with the invention.

Turning to FIGS. 2-10, an integrated hydrostatic transmission (IHT) 20 is illustrated. The IHT 20 includes a pump 21 connected to a motor 22 (see FIG. 8) and supported within a housing 23. The IHT 20 is mountable to a frame of a vehicle as a unit, as will be described. Although an IHT is illustrated, a hydrostatic transmission having a pump and motor separately mountable to a frame of a vehicle could alternatively be provided.

The pump 21 is located within a pump housing portion 24 of the hydrostatic transmission housing 23. The pump 21 in the hydrostatic transmission of FIGS. 2-10 is a piston pump, but other types of pumps can be used. The pump housing portion 24 includes a plurality of cooling fins 26 for dissipating heat generated by the hydrostatic transmission 20.

A pump shaft 28 is supported by the pump housing portion 24 and is configured to drive the pump 21. The pump shaft 28 extends from opposite sides of the pump housing portion 24. A pulley 30 is provided on the lower end of the shaft 28 for connection via a belt, or other suitable means, to a prime mover such as the internal combustion engine of the mower 10. A fan 32 is secured to the upper end of the pump shaft 28 and is configured to draw air across the hydrostatic transmission 20 for cooling purposes.

Also contained within the pump housing portion 24 is an internal oil filter 34 for filtering the fluid of the hydrostatic transmission 20. As will be described in connection with FIGS. 9-12, the location of the oil filter 34 on a lower surface of the pump housing portion 24 facilitates changing of the transmission fluid by removal of the oil filter 34. Alternatively, an external oil filter (for example oil filter 186 in FIGS. 13-16 described herein) could be provided.

A trunnion arm 36 extends through the pump housing portion 24 and is configured to actuate a swash plate to control the flow direction and flow rate of the pump 21 in a conventional manner. The trunnion 36 can be connected to the controls 16 of the mower 10 directly or via a suitable linkage.

The pump housing portion 24 is connected to a motor housing portion 38 containing motor 22 via a bridge member 40. In the illustrated embodiment, the bridge member 40 is part of the pump housing portion 24. Alternatively, the bridge member 40 could be part of the motor housing portion 38, or a separate member to which both the pump housing portion 24 and the motor housing portion 38 connect. The bridge member 40 contains passageways (e.g., supply and return lines) for the supply and return of the fluid between the pump 21 and motor 22.

The motor 22 is supported within the motor housing portion 38. The motor housing portion 38 includes a mounting surface 50 which can be butted against a frame member of a vehicle for securing the hydrostatic transmission 20 to the frame using bolts inserted through the frame and into bolt holes 52. An end plate 54 of the motor housing portion 38 has bolt holes 56 associated therewith for further securing the hydrostatic transmission 20, for example, in the manner described in more detail below.

A motor output shaft 60 extends from the motor housing portion 38 and is supported therein by one or more bearings. The motor output shaft 60 includes a key way 62 for receiving a key for securing a hub of a wheel directly to the output shaft 60 for rotation therewith.

Figure 8:
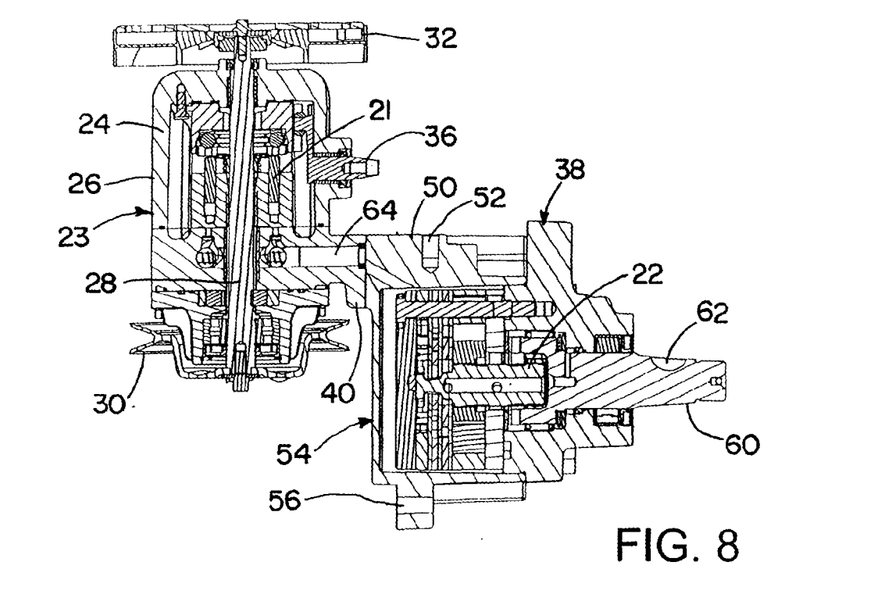
FIG. 8 is a cross-sectional view of the hydrostatic transmission taken along the line 8-8 in FIG. 7.

FIG. 8 illustrates the interior of the hydrostatic transmission 20. As described, the pump 21 and motor 22 are supported within respective pump housing portion 24 and motor housing portion 38 of the transmission housing 23. A pair of interior passageways 64 connect the pump 21 and motor 22 for the supply and return of fluid.

Figure 9:
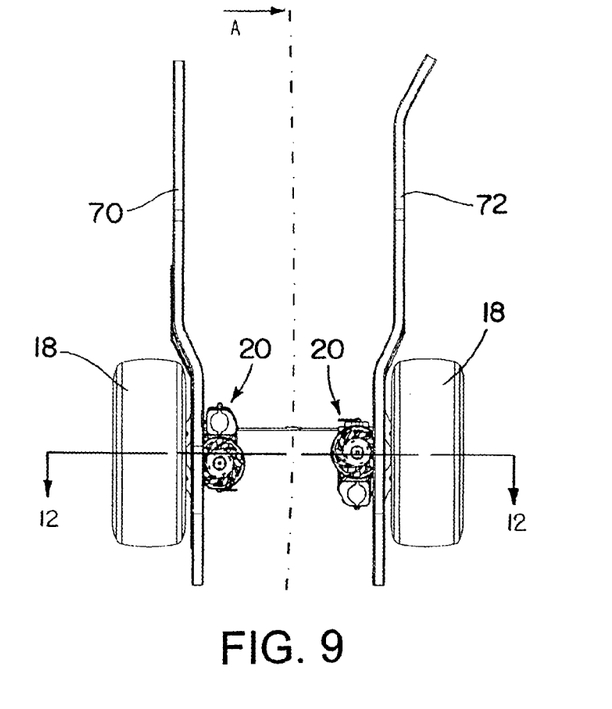
FIG. 9 is a top view of a frame of the mower of FIG. 1 with first and second hydrostatic transmissions mounted thereto.
Figure 10:
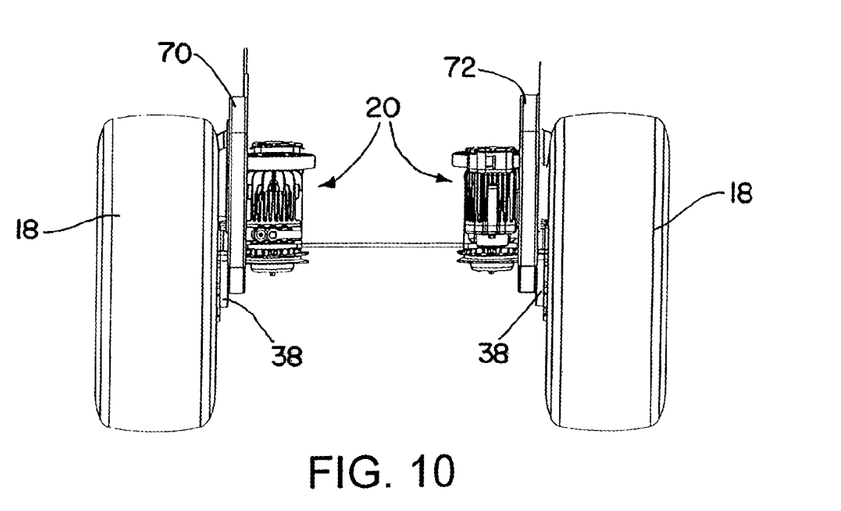
FIG. 10 is a rear view of the frame of the mower of FIG. 1 with first and second hydrostatic transmissions mounted thereto.

Turning now to FIGS. 9-12, and initially to FIG. 9, a pair of hydrostatic transmissions 20 as just described are illustrated mounted to the frame 12 of the mower 10. A first hydrostatic transmission 20 is mounted to a left side frame rail 70 and a second hydrostatic transmission 20 is mounted to a right frame side rail 72. Each hydrostatic transmission 20 is mounted such that the pump shaft 28 extends vertically while the motor shaft 60 extends horizontally outwardly from the respective frame side rail 70, 72.

It will be appreciated that the left and right hydrostatic transmissions 20 in the illustrated embodiment are identical units capable of being mounted on the left or right frame side rail 70, 72 without modification, by rotating the hydrostatic transmission 180 degrees about its vertical axis. In this regard, the fan 32 on the left side hydrostatic transmission 20 is located at a rearward location while the fan 32 on the right side hydrostatic transmission 20 is located at a forward position.

Figure 11:
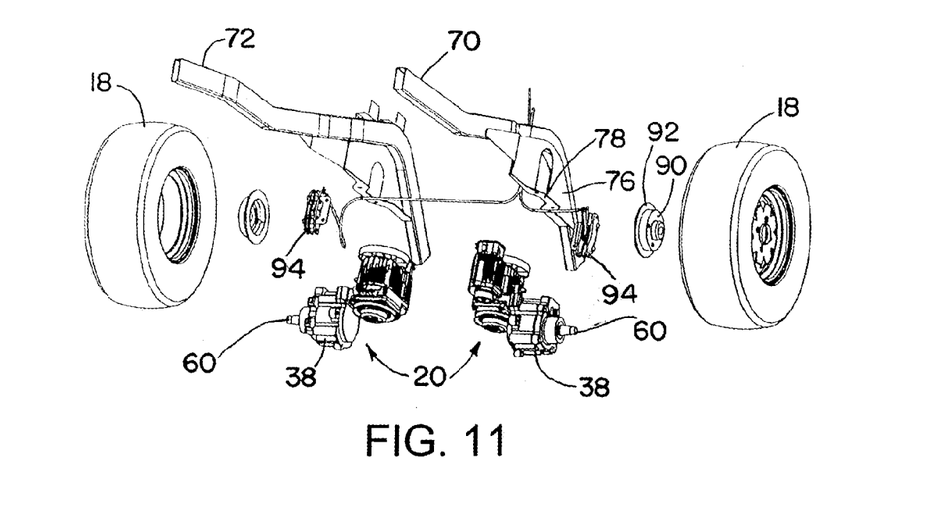
FIG. 11 is an assembly view of the frame of the mower of FIG. 1 including the first and second hydrostatic transmissions.

In FIG. 11, the mounting of the hydrostatic transmissions 20 to the frame 12 is illustrated. Some components of the mower 10 and frame 12 have been omitted for clarity. The frame 12 includes longitudinally extending left side rail 70 and right side rail 72. Both left and right side rail members 70, 72 have a mounting surface 76 for supporting the hydrostatic transmissions 20. In the illustrated embodiment, the mounting surface 76 is part of a bracket secured to each frame side rail 70, 72. Alternatively, the mounting surface 76 can be a portion of the frame side rail. Each illustrated mounting surface 76 includes a flange portion 78 extending outwardly from the mounting surface 76 at a generally right angle for mating with mounting surface 50 on respective hydrostatic transmissions 20. The flange portions 78 include two bores for receiving bolts or other suitable fasteners for securing the hydrostatic transmissions 20 thereto. The bolts extend through the flange portion into bores 52 in the mount surface 50 of each hydrostatic transmission 20.

Once secured to a side rail 70, 72, the pump housing portions 24 of the hydrostatic transmissions 20 are located inwardly of the side frame rails 70, 72 towards a longitudinal centerline (axis A) of the frame 12. The motor housing portions 38 extend outwardly from respective side rails 70 and 72 away from the longitudinal centerline of the frame 12.

The hydrostatic transmissions 20 are configured to be mounted to the frame side rails 70, 72 such that the motor housing portions 38 hang from the mounting bracket 76 for facilitating direct connection of the motor output shafts 60 to respective wheels 18. Accordingly, to provide lateral support to the motor housing portion 38 of each hydrostatic transmission 20, a stabilizer bar (not shown) can be provided between the motor housing portions 38 of each hydrostatic transmission 20. Such a stabilizer bar can be configured to generally resists torsional loads applied to the hydrostatic transmissions 20, such as by the vehicle weight acting on the motor output shafts 60.

Each motor output shaft 60 is connected to a respective wheel 18 via a hub member 90 that is secured to the motor output shaft 60 by a key or other suitable means. The hub member 90 in the illustrated embodiment includes a brake rotor 92 to be engaged by calipers 94 to effect braking of each respective wheel 18 in a conventional manner.

Figure 12:
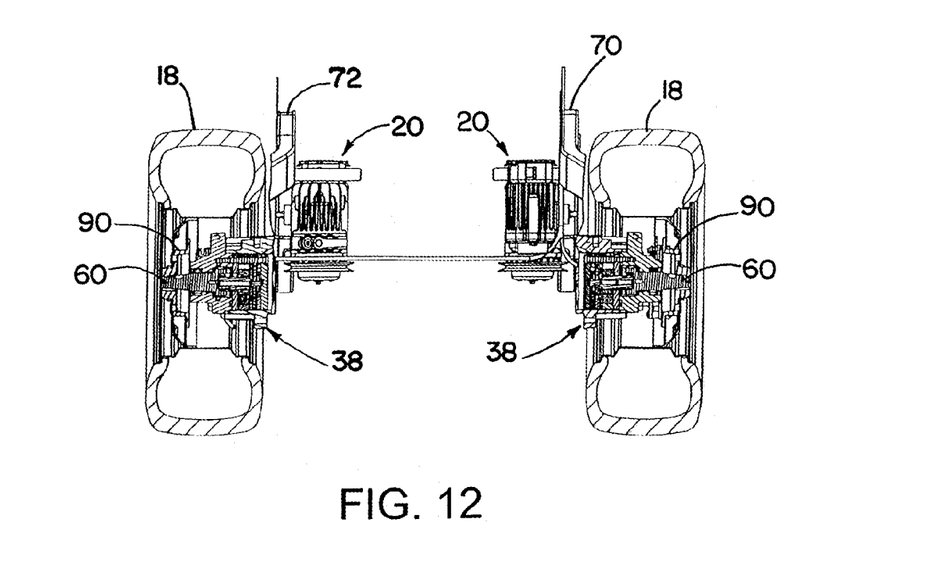
FIG. 12 is a cross-sectional view taken along the line 12-12 in FIG. 9
Figure 13:
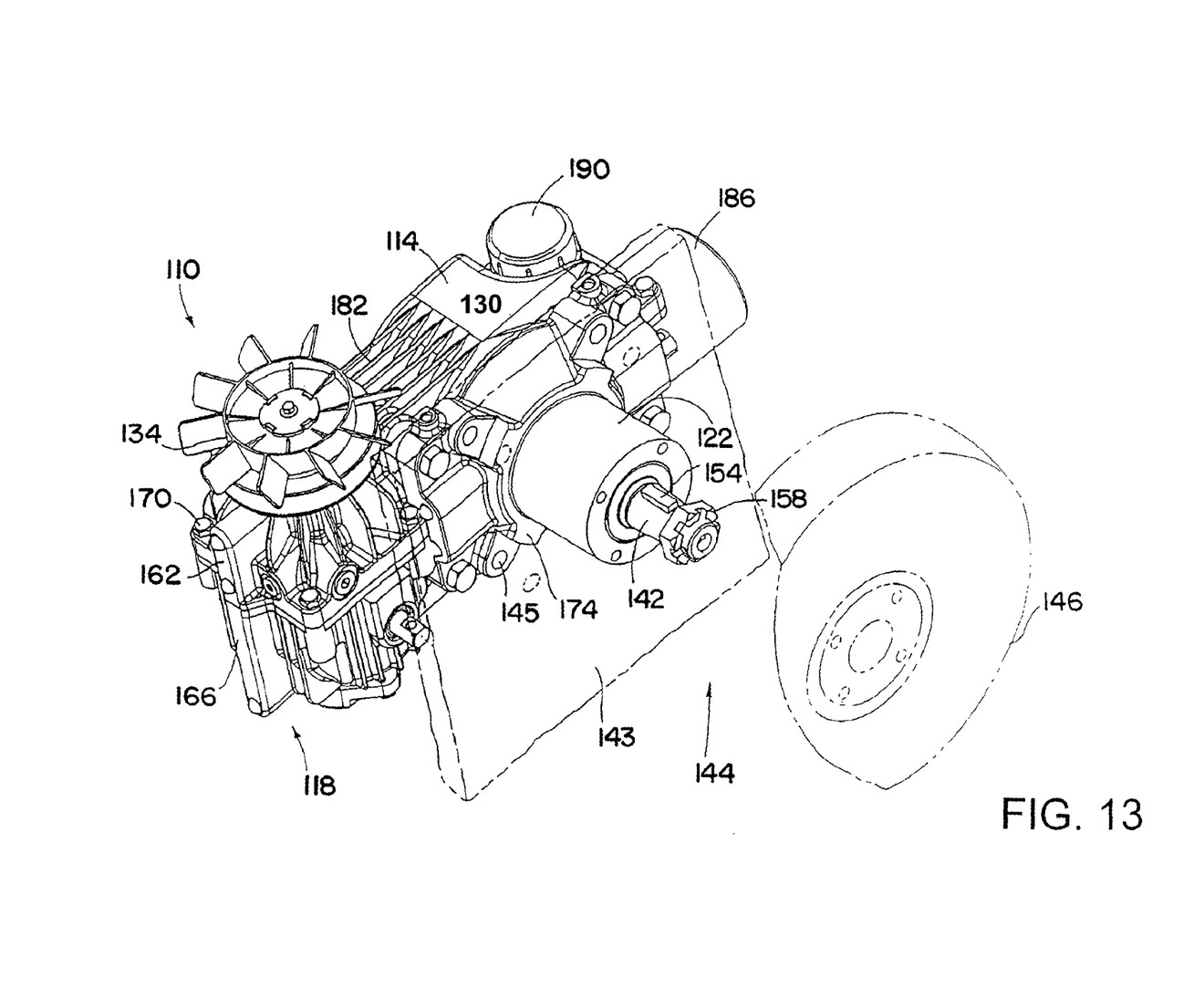
FIG. 13 is a perspective view of another exemplary hydrostatic transmission in accordance with the present invention.
Figure 14:
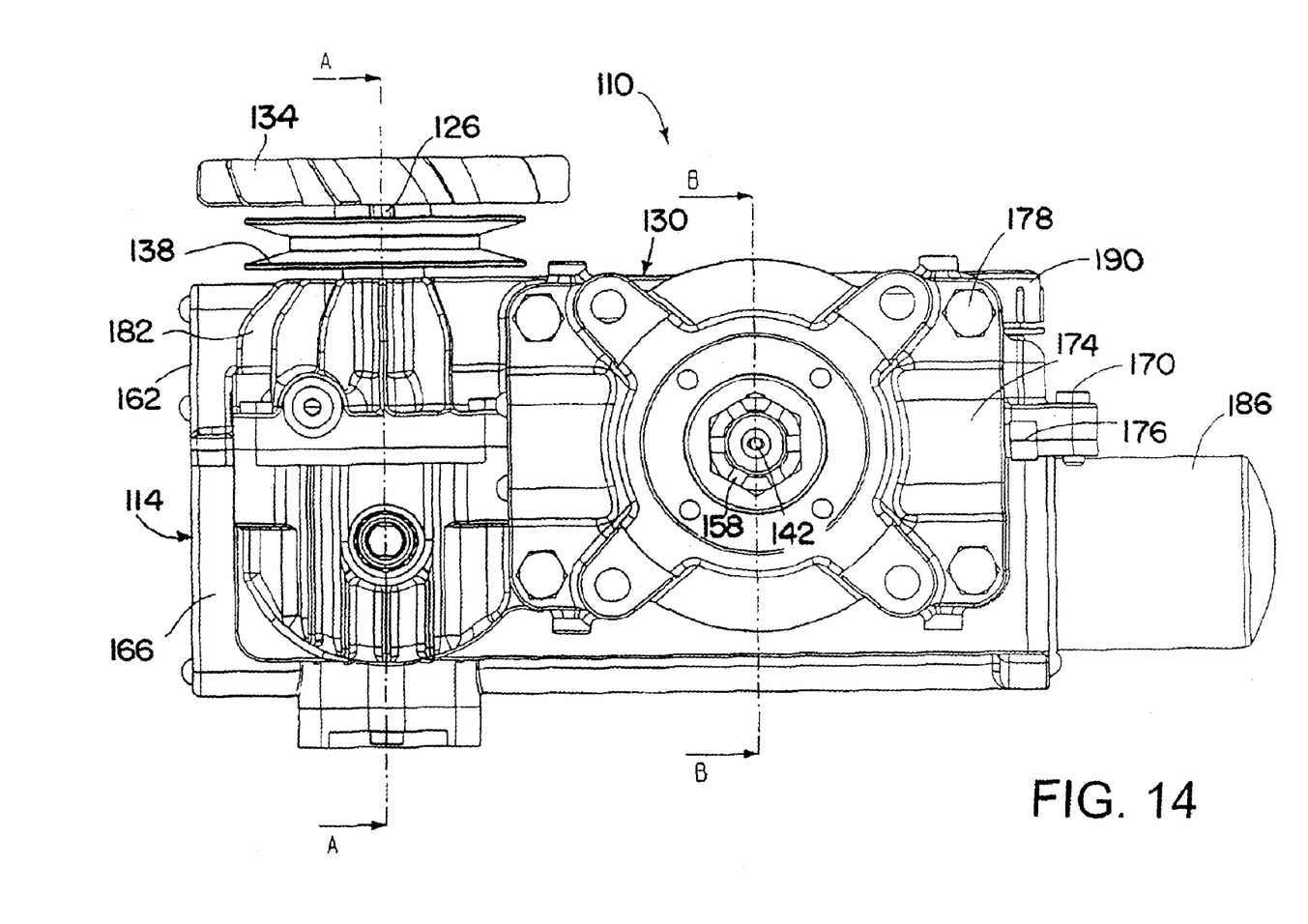
FIG. 14 is a side view of the hydrostatic transmission of FIG. 13.
Figure 15:
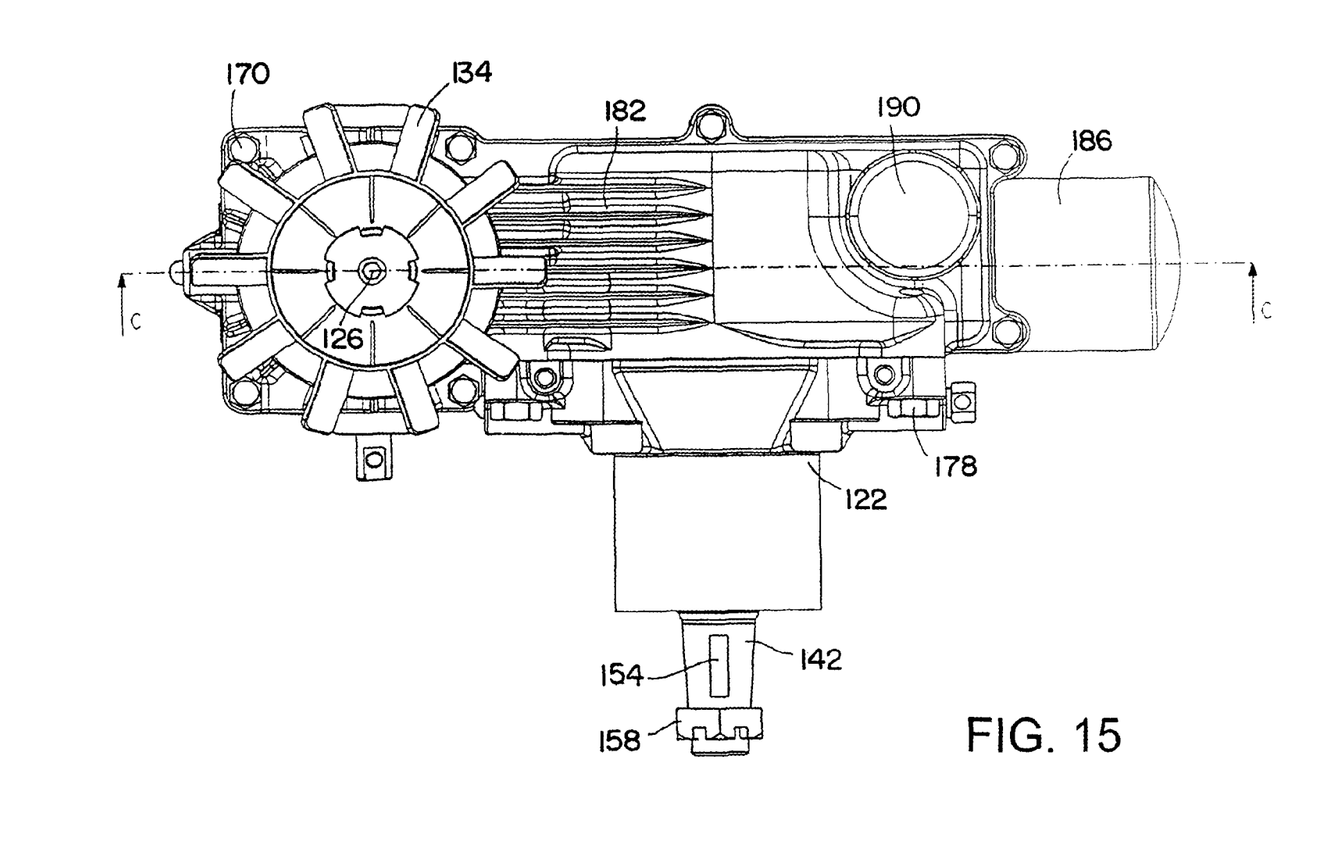
FIG. 15 is a top view of the hydrostatic transmission of FIG. 13.
Figure 16:
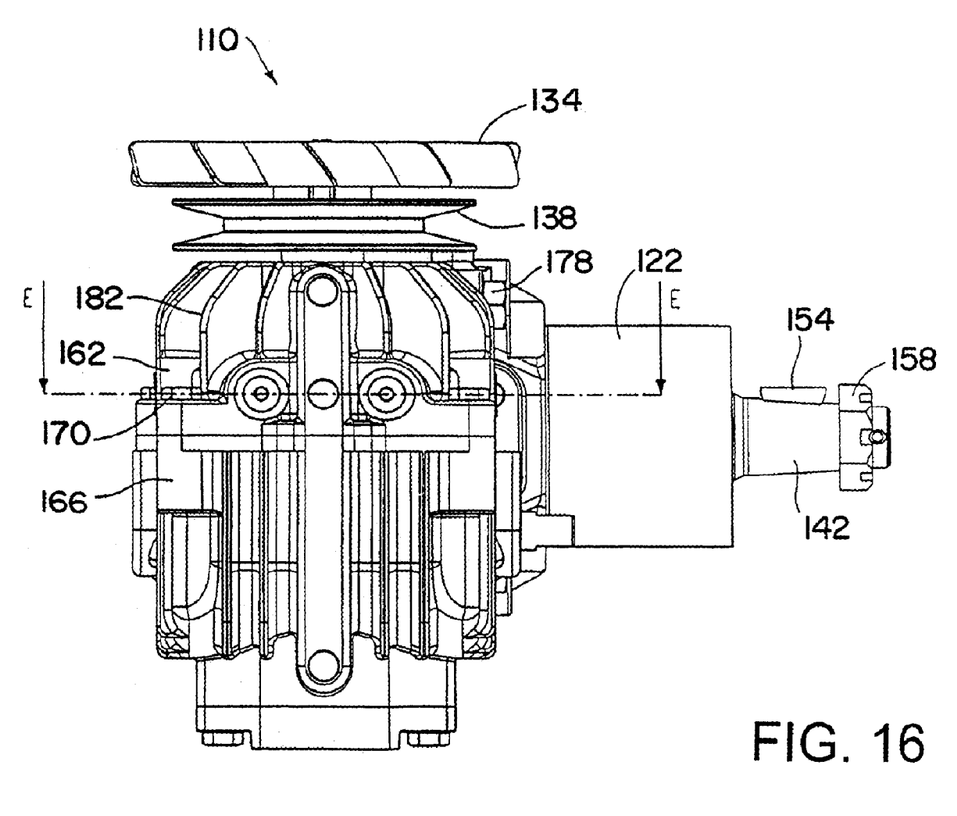
FIG. 16 is a front view of the hydrostatic transmission of FIG. 13.

Turning now to FIG. 12, it will now be appreciated that when the hydrostatic transmissions 20 are mounted to the left and right side rails 70, 72 of the frame 12, the pump housing portions 24 are located within the frame side rails 70, 72, while the motor housing portions 38 are located outside the frame side rails 70, 72. The motor housing portions 38 are at least partially received within wheel wells of respective wheels 18, and the motor output shafts 60 are directly connected to respective wheels 18 for independently driving the same. It will be appreciated that the wheel well of each wheel is generally defined as the region space within the rim portion of the wheel 18.

It will be appreciated that locating the motor housing portions 38 at least partially received within the wheels 18 utilizes otherwise wasted space within the wheels 18. This can be advantageous for smaller applications, such as consumer zero-turn-radius mowers. Further, the motor housing portions 38 may be exposed to lower temperatures and greater air flow outside of the frame 12 thereby facilitating greater heat dissipation from the hydrostatic transmissions 20.

Turning to FIGS. 13-16, another IHT 110 is illustrated. The IHT 110 comprises a housing 114 containing a reversible pump 118 fluidly connected to a motor 122 in a closed loop hydraulic circuit. An input shaft 126 for driving the pump 118 extends vertically from a top 130 of the housing 114 and includes a fan 134 and pulley 138. The pulley 138 can be connected by a belt to a prime mover, such as an internal combustion engine of a vehicle (not shown), for turning the input shaft 126. An output shaft 142 driven by the motor 122 extends horizontally from a side of the housing 114. As will be appreciated, the pump 118 supplies pressurized hydraulic fluid to an inlet of the motor 122 for driving the output shaft 142.

IHT 110 can be mounted to a frame 143 of a vehicle, generally indicated by reference number 144, using bolt holes 145 through which bolts can extend to secure the IHT 110 to the vehicle frame 143. A wheel 146 can be mounted to an outer axle portion of the output shaft 142 of the IHT 110 for supporting the vehicle 144 for movement over the ground. In the illustrated embodiment, the output shaft 142 has a tapered portion provided with a key 154 that engages in a key slot in the hub of a wheel 146 so that the wheel 146 will rotate with the output shaft 142. The wheel 146 can be secured in place by means of a nut 158 which is threaded onto the end of the axle output shaft 142.

The housing 114 of the IHT 110 includes an upper housing part 162 and a lower housing part 166 secured together with bolts 170, or by other suitable means. A sealing gasket is typically provided at the interface of the upper housing portion 162 and the lower housing portion 166. The upper housing portion 162 and the lower housing portion 166 together form a generally circular opening into which the motor 122 is received. The opening is closed by a mounting plate 174 that carries the motor 122. The mounting plate 174 is secured to the upper housing portion 162 and the lower housing portion 166 by bolts 178, or by other suitable means. A sealing gasket can be provided at the interface of the upper housing portion 162, the lower housing portion 166, and the mounting plate 174. The mounting plate 174 may be provided with a bypass valve 176 for creating a short fluid circuit in the motor 122 to allow free rotation of the output shaft 142 when desired.

The upper housing portion 162, the lower housing portion 166, and the mounting plate 174 together form a sealed interior space of the housing 114 that contains the motor 122 and pump 118. The interior of the housing 114 serves as a shared sump for the motor 122 and the pump 118, and further may function as a reservoir.

The housing 114 further includes cooling fins 182 at various locations, generally on the top surface 130 near the fan 134, for assisting in dissipating heat generated during operation of the pump 118 and motor 122 of the IHT 110. As will be described below, the housing 114 can further include an externally mounted oil filter 186 for filtering the hydraulic fluid of the IHT 110. The externally mounted oil filter 186 can be easily accessed for replacement when the filter becomes dirty. A breather 190 is provided for allowing air to exit and enter the housing 114 as necessary to compensate for thermal expansion and contraction of the hydraulic fluid. The breather 190 can also function as a fill cap for adding hydraulic fluid to the shared sump. Although not shown, a drain plug can be included at the bottom of the housing 114 for draining the hydraulic fluid so that fresh hydraulic fluid can be added to the housing 114. Further details of the IHT 110 illustrated in FIGS. 13-16 can be found in U.S. patent application Ser. No. 11/183,177 filed on Jul. 15, 2005, which is hereby incorporated by reference.

Figure 17:
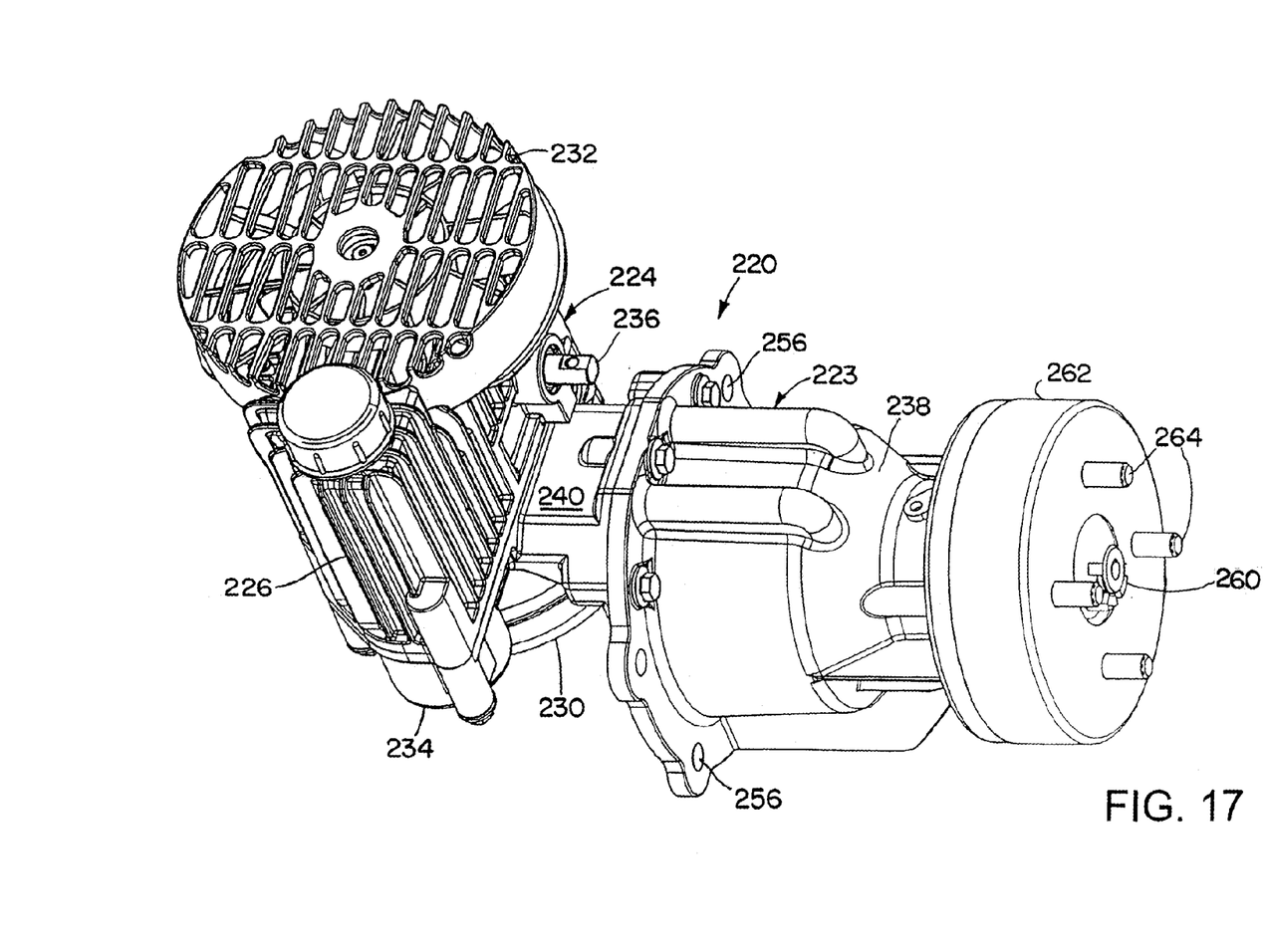
FIG. 17 is a perspective view of another integrated hydrostatic transmission in accordance with the present invention.
Figure 18:
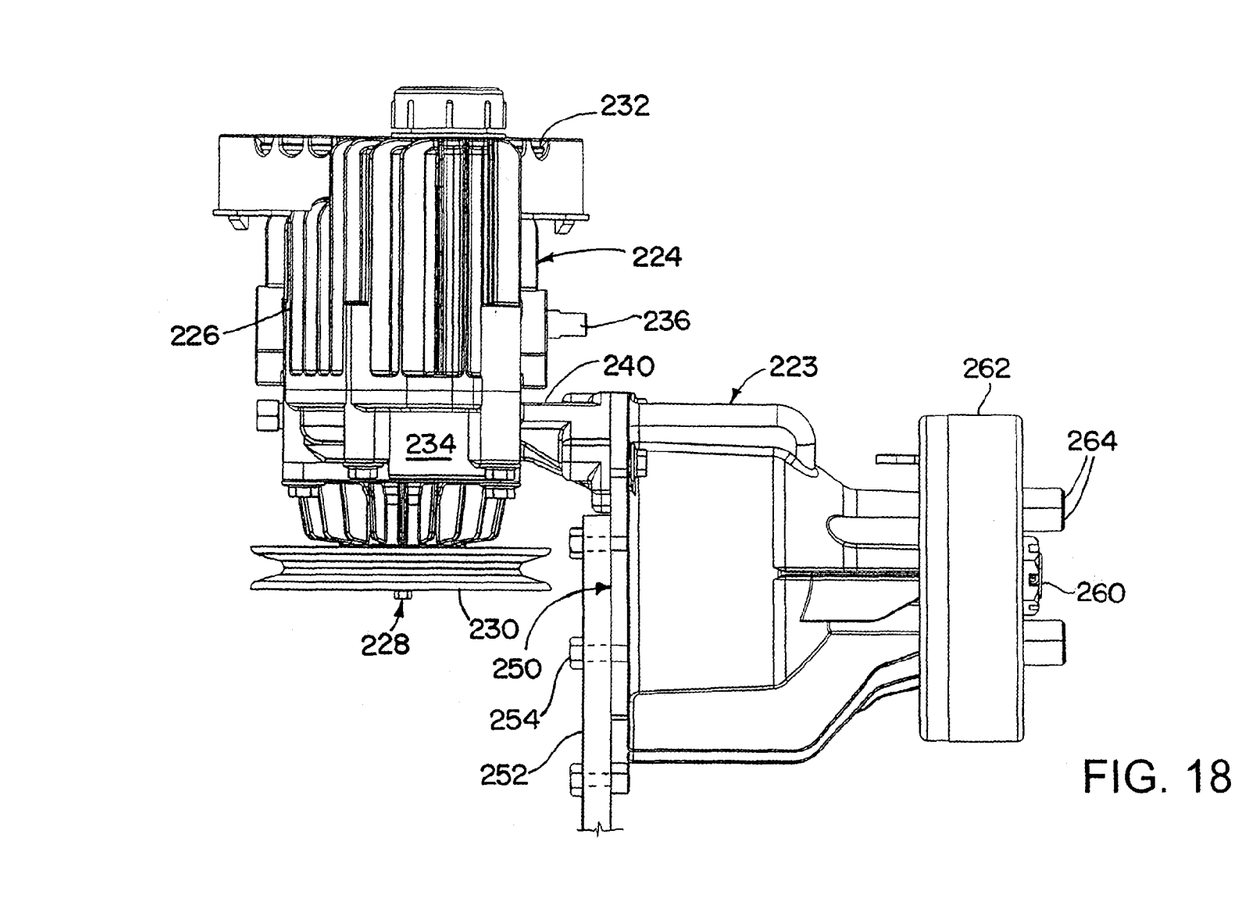
FIG. 18 is a rear elevational view of the hydrostatic transmission of FIG. 17 mounted to a frame of a vehicle.

Turning to FIGS. 17 and 18, yet another hydrostatic transmission 220 in accordance with the invention is illustrated. The hydrostatic transmission 220 is similar to the hydrostatic transmission illustrated and described in connection with FIGS. 2-12. The transmission 220 includes a pump connected to a motor and supported within a housing 223.

The housing 223 of the IHT 220 has a pump housing portion 224 within which the pump is located. The pump housing portion 224 includes a plurality of cooling fins 226 for dissipating heat generated by the hydrostatic transmission 220. Also contained within the pump housing portion 224 is an internal oil filter 234 for filtering the fluid of the hydrostatic transmission 220.

A pump shaft 228 is supported by the pump housing portion 224 and is configured to drive the pump. The pump shaft 228 extends from opposite sides of the pump housing portion 224. A pulley 230 is provided on the lower end of the shaft 228 for connection via a belt, or other suitable means, to a prime mover such as the internal combustion engine of the mower 10. A fan 232 is secured to the upper end of the pump shaft 228 and is configured to draw air across the hydrostatic transmission 220 for cooling purposes.

A trunnion arm 236 extends through the pump housing portion 224 and is configured to actuate a swash plate to control the flow direction and flow rate of the pump in a conventional manner. The trunnion 236 can be connected to the controls 16 of the mower 10 directly or via a suitable linkage.

The pump housing portion 224 is connected to a motor housing portion 238 containing via a bridge member 240. In the illustrated embodiment, the bridge member 240 is part of the pump housing portion 224. Alternatively, the bridge member 240 could be part of the motor housing portion 238, or a separate member to which both the pump housing portion 224 and the motor housing portion 238 connect. The bridge member 240 contains passageways (e.g., supply and return lines) for the supply and return of the fluid between the pump and motor.

The motor is supported within the motor housing portion 238. The motor housing portion 238 includes a mounting surface 250 which can be butted against a frame member 252 of a vehicle for securing the hydrostatic transmission 220 to the frame using bolts 254 inserted through the frame 252 and into bores 256.

A motor output shaft 260 extends from the motor housing portion 238 and is supported therein by one or more bearings. A hub of a wheel 262 is secured to the output shaft 260 for rotation therewith. Four studs 264 extend from the hub 262 and are configured to receive a wheel of a vehicle.

It will be appreciated that the motor housing, and our motor housing portions of the hydrostatic transmissions described above function as a portion of the vehicle frame for the purpose of supporting the vehicle for movement over a surface. In this regard, the motor housings can be considered subframe elements in which the motor is supported. In some applications, therefor, it may be desirable to provide a more robust motor housing to accommodate the increased loads placed thereon as a result of supporting the vehicle, as compared to motor and/or hydrostatic transmission that does not support a vehicle.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A hydrostatic transmission mountable as a unit to a frame of a vehicle, the transmission comprising:
   a housing assembly having a pump portion, a motor portion, and a bridge portion between the pump and motor portions;
   a pump contained within the pump portion, the pump configured to be driven by an input shaft of the hydrostatic transmission; and
   a motor contained within the motor portion and connected to the pump via supply and return lines, the motor configured to drive an output shaft of the hydrostatic transmission;
   wherein the housing assembly includes a mounting surface for enabling the hydrostatic transmission to be secured to the frame such that the output shaft and motor portion of the housing assembly extend outwardly from the frame such that when the output shaft is connected to a wheel, the motor portion of the housing is at least partially received within the wheel; and
   wherein the input shaft and the output shaft extend generally perpendicular to one another from the housing assembly whereby when the transmission is mounted to the frame the input shaft is oriented on an underside of the transmission whereby a drive wheel can be mounted to the input shaft on a lower end thereof.

2. A hydrostatic transmission as set forth in claim 1, wherein a distal end of the output shaft is configured to be an axle for supporting the wheel when connected thereto.

3. A hydrostatic transmission as set forth in claim 1, wherein the mounting surface is associated with the motor portion of the housing assembly such that radial loads applied to the output shaft are transmitted to the frame via the motor portion when the transmission is mounted to the frame.

4. A vehicle comprising the frame, the hydrostatic transmission set forth in claim 1 mounted to the frame, and a wheel mounted to the output shaft of the hydrostatic transmission for supporting the vehicle for movement over a surface.

5. A hydrostatic transmission as set forth in claim 1, wherein the pump has a trunnion for controlling output of the pump, the trunnion extending from the housing assembly in a common direction with the output shaft.

6. A vehicle comprising:
   a frame;
   a hydraulic motor assembly supported by the frame, the motor assembly including a housing and a rotatably driven output shaft;
   a wheel mounted to the output shaft of the motor assembly for supporting the vehicle for movement over a surface;
   a hydraulic pump assembly connected to the hydraulic motor assembly by supply and return lines; and
   a pulley wheel secured to a lower end of an input shaft of the pump assembly for connection to a prime mover;
   wherein the hydraulic motor assembly is at least partially received within the wheel; and
   wherein the pulley wheel is located below an underside of the pump assembly.

7. A vehicle as set forth in claim 6, wherein the hydraulic motor assembly is external to the frame.

8. A vehicle as set forth in claim 6, further including a housing assembly that includes the motor housing, a pump housing, and a bridge member between the motor housing and the pump housing.

9. A vehicle as set forth in claim 6, wherein the hydraulic pump assembly is located inwardly of the frame towards a longitudinal axis of the vehicle and the hydraulic motor assembly is located outwardly from the frame away from the longitudinal axis of the vehicle.

10. A vehicle as set forth in claim 6, wherein the housing of the motor supports the output shaft of the motor for transmitting radial loads applied to the output shaft to the frame.

11. A vehicle as set forth in claim 6, further comprising a brace member secured to the motor housing and the frame for resisting torsion resulting from radial loads applied to the output shaft.

12. A vehicle as set forth in claim 6, wherein the pump assembly has a trunnion for controlling output of the pump assembly, the trunnion extending from the pump assembly in a common direction with the output shaft of the motor assembly.

13. A vehicle comprising:
a frame;
a hydraulic motor assembly supported by the frame, the motor assembly including a housing and a rotatably driven output shaft;
a wheel mounted to the output shaft of the motor assembly for supporting the vehicle for movement over a surface;
a hydraulic pump assembly connected to the hydraulic motor assembly by supply and return lines; and
a pulley wheel secured to a lower end of an input shaft of the pump assembly for connection to a prime mover;
wherein the hydraulic motor assembly is at least partially received within the wheel, and
wherein the hydraulic pump assembly and hydraulic motor assembly are part of a hydrostatic transmission assembly mounted to the frame as a unit, the input shaft of the pump assembly and the output shaft of the motor assembly extending from the transmission assembly generally perpendicular to each other.

* * * * *